United States Patent
Grazzi et al.

(10) Patent No.: US 8,207,285 B2
(45) Date of Patent: Jun. 26, 2012

(54) HIGH SHRINK POLYPROPYLENE FILMS

(75) Inventors: Michele Grazzi, Casaglia (IT); Claudio Cavalieri, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 435 days.

(21) Appl. No.: 12/448,395

(22) PCT Filed: Dec. 5, 2007

(86) PCT No.: PCT/EP2007/063344
§ 371 (c)(1),
(2), (4) Date: Jun. 18, 2009

(87) PCT Pub. No.: WO2008/074636
PCT Pub. Date: Jun. 26, 2008

(65) Prior Publication Data
US 2010/0298516 A1 Nov. 25, 2010

Related U.S. Application Data

(60) Provisional application No. 60/876,735, filed on Dec. 22, 2006.

(30) Foreign Application Priority Data

Dec. 21, 2006 (EP) ...................... 0612749

(51) Int. Cl.
*C08L 23/10* (2006.01)
*C08F 210/06* (2006.01)
*C08F 10/06* (2006.01)
*B29C 55/04* (2006.01)

(52) U.S. Cl. .................. 526/348; 526/348.1; 526/348.2; 526/348.5; 526/348.6; 526/351

(58) Field of Classification Search .................. 526/348, 526/351
See application file for complete search history.

(56) References Cited

U.S. PATENT DOCUMENTS

| 4,399,054 A | 8/1983 | Ferraris et al. |
| 4,469,648 A | 9/1984 | Ferraris et al. |
| 4,670,529 A | 6/1987 | Kitamura et al. |
| 4,822,840 A * | 4/1989 | Kioka et al. ................. 525/240 |
| 4,971,937 A | 11/1990 | Albizzati et al. |
| 5,221,651 A | 6/1993 | Sacchetti et al. |
| 5,292,561 A | 3/1994 | Peiffer et al. |
| 5,698,642 A | 12/1997 | Govoni et al. |
| 6,127,304 A | 10/2000 | Sacchetti et al. |
| 6,303,233 B1 * | 10/2001 | Amon et al. ................. 428/516 |
| 6,323,152 B1 | 11/2001 | Sacchetti et al. |
| 6,407,028 B1 | 6/2002 | Sacchetti et al. |
| 6,413,477 B1 | 7/2002 | Govoni et al. |
| 6,437,061 B1 | 8/2002 | Sacchetti et al. |
| 6,686,307 B2 | 2/2004 | Sacchetti et al. |
| 6,727,000 B2 | 4/2004 | Joly et al. |
| 6,808,822 B2 * | 10/2004 | Rajan et al. ................. 428/516 |
| 6,818,583 B1 | 11/2004 | Morini et al. |
| 6,875,485 B2 * | 4/2005 | Kanai et al. ................. 428/34.1 |
| 7,022,640 B2 | 4/2006 | Morini et al. |
| 7,049,377 B1 | 5/2006 | Morini et al. |
| 7,323,252 B2 * | 1/2008 | Obata et al. ................. 428/516 |
| 7,410,706 B2 * | 8/2008 | Rodick ........................ 428/500 |
| 2002/0176974 A1 * | 11/2002 | Hanyu et al. ................. 428/213 |

FOREIGN PATENT DOCUMENTS

| EP | 45977 | 2/1982 |
| EP | 145014 | 6/1985 |
| EP | 361494 | 4/1990 |
| EP | 395083 | 10/1990 |
| EP | 457568 | 11/1991 |
| EP | 477742 | 4/1992 |
| EP | 728769 | 8/1996 |
| EP | 782587 | 7/1997 |
| EP | 1272533 | 1/2003 |
| JP | 2003-205548 A * | 7/2003 |
| JP | 2004-250682 A * | 9/2004 |
| JP | 2005-330386 A * | 12/2005 |
| JP | 2006-082383 A * | 3/2006 |
| WO | 98/44009 | 10/1998 |
| WO | 00/63261 | 10/2000 |
| WO | 01/70500 | 9/2001 |

* cited by examiner

*Primary Examiner* — Rip A. Lee
(74) *Attorney, Agent, or Firm* — Dilworth IP LLC

(57) ABSTRACT

Mono-oriented film having a shrink rate at 100° C. of at least 15% and at least one layer of which comprises a propylene copolymer with ethylene and optionally other olefins of formula $CH_2=CHR$ in which R is an alkyl group containing from 2 to 10 carbon atoms, having at least 5.5% wt of ethylene, a melt flow rate according to ISO 1133 (230° C., 2.16 Kg) of less than 10, and a fraction of polymer soluble in xylene at 25° C. ranging from 14 to 30% weight based on the total weight of said copolymer. The said films are particularly suited for the manufacturing of shrink labels.

7 Claims, No Drawings

HIGH SHRINK POLYPROPYLENE FILMS

This application is the U.S. national phase of International Application PCT/EP2007/063344, filed Dec. 5, 2007, claiming priority to European Application 06126749.8 filed Dec. 21, 2006 and the benefit under 35 U.S.C. 119(e) of U.S. Provisional Application No. 60/876,735, filed Dec. 22, 2006; the disclosures of International Application PCT/EP2007/063344, European Application 06126749.8 and U.S. Provisional Application No. 60/876,735, each as filed, are incorporated herein by reference.

The present invention relates to mono-oriented polypropylene based films having high rate of shrinkage and to articles obtained therefrom. In particular, the polypropylene compositions described herein below are suitable for application in the production of labels to be used in the packaging field where they combine the high shrinkage with good mechanical and optical properties.

In many technological fields plastics is becoming the material of choice replacing other materials like glass, metals etc. One of those fields is certainly the package of beverages in which plastics is now becoming the dominant material with polyvinylchloride and polyethylene terephthalate being the most employed. Usually, the bottles or cans are plain, with no indication as to the origin, the ingredients, and the producer of their content. All such information is provided separately by way of the label which is successively applied to the bottle or can. In order to apply the label many labeling technologies are in place with sleeve label application and roll-fed shrink label application being among the most important. In the sleeve label technology a sleeve is first created by a piece of mono-oriented film roll film and is then let to fall down over the bottle to encapsulate it. The sleeve with the bottle inside is then passed in an oven the heat of which causes the film label to shrink and to perfectly adhere to the bottle shape. The principle is the same in the roll-fed technology with the difference that the sleeve around the bottle is created by the simultaneous rotation of the bottle itself and of the adjacent film roll which allows the film to wrap the bottle. In both technologies, the material with which the mono-oriented films originating the labels is made of, is usually the same as the bottle or cans are made of and that is polyvinylchloride or polyethylene terephthalate. These materials perfectly fit the technical requirements for applicability and in particular the high shrinkage which makes them able to create perfectly adhering labels even when the shape of the bottle implies sections of very different diameters to each other because of the need to impart special functions to the bottles, like facilitating the handling, or providing an aesthetic effect. However, one further characteristic of these materials when formed into labels is the fact that they all are endowed with a density higher than that of the water and that therefore they cannot be separated from the rest of the bottle components, bottle itself and closures, via water floating systems as all of them would sink. This latter feature together with relatively high costs constitutes a heavy disadvantage for these materials especially in these times when the issue of reducing the environmental impact is becoming so urgent.

Polyolefin based materials are endowed with a density lower than that of water and this would make them fit water based recycling system. However, their applicability has not been of practical interest up to now because of their rather limited shrink capability and/or of an insufficient balance between shrink and mechanical properties. In particular, concerning polypropylene, while the more crystalline products like homopolymer or conventional random polypropylene have limited shrink properties, the less crystalline or amorphous one although may be endowed with sufficient shrink capability, do not meet the required mechanical properties.

In order to solve the problem various solutions have been proposed. In EP457568 it is suggested to blend isotactic polypropylene with a substantial amount of low melt index polybutene in order to increase the shrink properties. In WO01/070500 it is proposed to prepare a multilayer film having good shrink properties combining an external layer A made of a propylene composition comprising a propylene-ethylene copolymer with up to 5% wt of ethylene and a propylene-ethylene-C4-C8 alpha olefin terpolymer with up to 5% of ethylene, and a core layer B made of an heterophasic propylene polymer composition. Regardless of the final properties, both suggestions suffer from the disadvantage that they introduce additional complexity and cost to the system as they increase either the number of different materials or the number or layers or, in the latter documents of both.

It is therefore still felt the need of a recyclable preferably single material to be formed into films having high shrink and good mechanical properties.

The applicant has surprisingly found that when the mono-oriented films are made of a particular type of propylene polymer material they are able to satisfy the above mentioned needs. Therefore, it constitutes an object of the invention a mono-oriented film having a shrink rate at 100° C. of at least 15% and at least one layer of which comprises a propylene copolymer with ethylene and optionally other olefins of formula $CH_2=CHR$ in which R is an alkyl group containing from 2 to 10 carbon atoms, having at least 5.5% wt of ethylene, a melt flow rate according to ISO 1133 (230° C., 2.16 Kg) of less than 10, and a fraction of polymer soluble in xylene at 25° C. ranging from 14 to 30% weight based on the total weight of said copolymer.

Throughout the present application the term mono-oriented means a film in which the ratio between the stretch ratio in one direction and the stretch ratio in the perpendicular direction is higher then 2 and preferably higher than 4. The mono-oriented films described in the present application have preferably a ratio between the stretch ratio in one direction and the stretch ratio in the perpendicular direction of higher than 5 and more preferably higher than 6.

Preferably, the content of ethylene is at least 6% wt and more preferably comprised from 6 to 7.5% wt.

The melt flow rate value according to ISO 1133 (230° C., 2.16 Kg) is preferably less than 8 g/10', more preferably less than 5, even more preferably in the range 0.5-4 g/10 min. and in a particularly preferred aspect 0.9 to 3.5.

The fraction of polymer soluble in xylene at 25° C. preferably ranges from 15 to 25% wt. The xylene-soluble fraction is determined according to the method described below.

Preferably said copolymers have a melting point determined via DSC according to the method described below of less than 140° C. and preferably of less than 138° C.

The molecular weight distribution of the propylene polymer composition of the invention measured by the method set forth below is higher than 3.5 and preferably higher than 4.

The propylene polymer compositions of the invention typically have a flexural modulus lower than 700 MPa, preferably in the range of from 400 to 600 MPa and a ductile/brittle transition temperature not higher than 5° C., preferably in the range −20 to 0° C. in their non-nucleated state. Moreover, said propylene polymer compositions typically have a haze value measured on 1 mm plaque not higher than 40%.

The propylene polymer compositions of the present invention can be prepared by polymerizing the said monomer either in the liquid or gas-phase polymerization reactor.

Preferably, the polymerization stage is carried out in presence of a highly stereospecific heterogeneous Ziegler-Natta catalyst. The Ziegler-Natta catalysts suitable for producing the propylene polymer compositions of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00/63261. Preferably, the solid catalyst component comprises Mg, Ti, halogen and an electron donor selected from esters of phthalic acids disclosed in EP45977 and in particular of either diisobutylphathalate or dihexylphthalate or diethylphthalate and mixtures thereof.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2.pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the succinate of formula (I) is used in molar ratio with respect to the $MgCl_2$ of from 0.01 to 1 preferably from 0.05 to 0.5. The preparation of catalyst components in spherical form is described for example in European patent application EP-A-395083 and in the International patent application WO98/44001. The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10.000 Å generally ranges from 0.3 to 1.5 $cm^3/g$, preferably from 0.45 to 1 $cm^3/g$.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-metil-dimethoxysilane. The external electron donor compound is used in such an amount to give a molar ratio between the organo-aluminum compound and said electron donor compound of from 0.1 to 500.

As mentioned above, the polymerization process can be carried out in gas phase and/or in liquid phase, in continuous or batch reactors, such as fluidized bed or slurry reactors. The catalytic system can be pre-contacted (pre-polymerized) with small amounts of olefins. The molecular weight of the propylene polymer composition is regulated by using known regulators, such as hydrogen.

According to a preferred embodiment, the propylene copolymer polymer is produced by a gas-phase polymerization process carried out in at least two interconnected polymerization zones. Said polymerization process is described in the European patent EP 782587.

The process is carried out in a first and in a second interconnected polymerization zone to which propylene and ethylene or propylene and alpha-olefins are fed in the presence of a catalyst system and from which the polymer produced is discharged. The growing polymer particles flow through the first of said polymerization zones (riser) under fast fluidization conditions, leave said first polymerization zone and enter the second of said polymerization zones (downcomer) through which they flow in a densified form under the action of gravity, leave said second polymerization zone and are reintroduced into said first polymerization zone, thus establishing a circulation of polymer between the two polymerization zones. Generally, the conditions of fast fluidization in the first polymerization zone is established by feeding the monomers gas mixture below the point of reintroduction of the growing polymer into said first polymerization zone. The velocity of the transport gas into the first polymerization zone is higher than the transport velocity under the operating conditions and is normally between 2 and 15 m/s. In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C. The process can be carried out under operating pressure of between 0.5 and 10 MPa, preferably between 1.5 and 6 MPa. Preferably, the various catalyst components are fed to the first polymerization zone, at any point of said first polymerization zone. However, they can also be fed at any point of the second polymerization zone. Molecular weight regulators known in the art, particularly hydrogen, can be used to regulate the molecular weight of the growing polymer.

The propylene copolymer used for the preparation of the films of the present invention may further comprise additives commonly employed in the polyolefin field, such as antioxidants, light stabilizers, nucleating agents, antiacids, and colorants.

The mono-oriented film according to the invention can be prepared by known technologies such as sequential or simultaneous orientation when stretching ratios in the two perpendicular directions are carefully adjusted. Furthermore any film extrusion line, either cast or blown equipped with post cold-stretching units (i.e. rolls) can be suitable for the production of film for the present invention.

As already mentioned the main application of the films of the invention is in the preparation of shrink labels through either sleeve label application or roll-fed shrink label application in which the films of the invention offer high shrink combined with good mechanical properties and easy recycle capability. Preferably, films according to the invention are applied to roll-fed shrink label application. In particular the shrink rate at 100° C. determined with the method set forth below is higher than 15% and preferably higher than 20%. When higher temperature (such as 110° C.) is applied the shrink rate is higher than 30% and preferably in the range of from 32-42%.

The following examples are given to illustrate and not to limit the present invention.

EXAMPLES

The data of the propylene polymer materials were obtained according to the following methods:

Xylene-Soluble Faction 2.5 g of polymer and 250 mL of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the filtered liquid is divided into two 100 ml aliquots. One 100 ml aliquot of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Comonomer (C2) Content
  By IR spectroscopy.
Molar Ratio of Feed Gasses
  Determined by gas-chromatography
Melt Flow Rate (MFR)
  Determined according to ISO 1133 (230° C., 2.16 Kg)
Tensile Modulus
  Determined according to ISO 178
Ductile/Brittle Transition Temperature (D/B)
  According to this method, the bi-axial impact resistance is determined through impact with an automatic, computerized striking hammer.

The circular test specimens are obtained by cutting with circular hand punch (38 mm diameter). They are conditioned for at least 12 hours at 23° C. and 50 RH and then placed in a thermostatic bath at testing temperature for 1 hour. The force-time curve is detected during impact of a striking hammer (5.3 kg, hemispheric punch with a ½" diameter) on a circular specimen resting on a ring support. The machine used is a CEAST 6758/000 type model no. 2.

D/B transition temperature is the temperature at which 50% of the samples undergoes fragile break when submitted to the above-mentioned impact test.

The plaques for D/B measurements, having dimensions of 127×127×1.5 mm are prepared according to the following method.

The injection press is a Negri Bossi™ type (NB 90) with a clamping force of 90 tons.

The mould is a rectangular plaque (127×127×1.5 mm).
The main process parameters are reported below:

| | |
|---|---|
| Back pressure (bar): | 20 |
| Injection time (s): | 3 |
| Maximum Injection pressure (MPa): | 14 |
| Hydraulic injection pressure (MPa): | 6-3 |
| First holding hydraulic pressure (MPa): | 4 ± 2 |
| First holding time (s): | 3 |
| Second holding hydraulic pressure (MPa): | 3 ± 2 |
| Second holding time (s): | 7 |
| Cooling time (s): | 20 |
| Mould temperature (° C.): | 60 |

The melt temperature is between 220 and 280° C.

Haze (on 1 mm Plaque)

According to the method used, 5×5 cm specimens are cut molded plaques of 1 mm thick and the haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method. 75×75×1 mm plaques are molded with a GBF Plastiniector G235/90 Injection Molding Machine, 90 tons under the following processing conditions:

| | |
|---|---|
| Screw rotation speed: | 120 rpm |
| Back pressure: | 10 bar |
| Melt temperature: | 260° C. |
| Injection time: | 5 sec |
| Switch to hold pressure: | 50 bar |
| First stage hold pressure: | 30 bar |
| Second stage pressure: | 20 bar |
| Hold pressure profile: | First stage 5 sec |
| | Second stage 10 sec |
| Cooling time: | 20 sec |
| Mold water temperature: | 40° C. |

Melting Temperature, Melting Enthalpy and Crystallization Temperature
  Determined by DSC with a temperature variation of 20° C. per minute
Film Preparation and Shrink Evaluation
Preparation of the OPP Film
  The polymer was compression moulded on a CARVER machine at 230° C. to obtain a plaque 0.5 mm thick and 60×60 mm which then has been stretched using TM-Long Film Stretcher machine at an oven temperature of 80° C. Stretching ratio was 1×7 to obtain a mono-oriented film having approximately 80 □m in thickness.

Shrinkage Measurement

Film shrinkage has been determined by placing 200×20 mm film samples in an oven with circulating air. Oven residence time was 180 seconds (+/−5 secs) at different air temperatures (100-110° C.). Calculation of the final film shrinkage has been determined by the following relation:

Film Shrinkage=$(Li-Lf)/Li*100$ being Li=Initial film dimension

Lf=Film dimension after the oven-treatment

Measurements were done when film reached the room temperature (approx. 15-20 minutes)

Example 1

The Ziegler-Natta catalyst was prepared according to the Example 5, lines 48-55 of the European Patent EP728769. Triethylaluminium (TEAL) was used as co-catalyst and dicyclopentyldimethoxysilane as external donor, with the weight ratios indicated in Table 1.

The propylene ethylene copolymer was prepared in polymerization process carried out in a gas-phase polymerization reactor comprising two interconnected polymerization zones, a riser and a downcomer, as described in the European Patent EP782587. The operative conditions are indicated in Table 1.

The polymer particles exiting from the reactor were subjected to a steam treatment to remove the unreacted monomers and dried.

The propylene polymer compositions were added with the additives indicated in Table 2 and extruded in a twin-screw extruder Berstorff (L/D=33) under the following operating conditions:

| | |
|---|---|
| Temperature of the feeding section: | 190-210° C. |
| Melt temperature: | 240° C. |
| Temperature of the die section: | 230° C. |
| Flow rate: | 16 Kg/h |
| Rotational speed: | 250 rpm |

The properties measured on the samples are collected in Table 2 together with the shrink results obtained by the films formed from the obtained copolymer according to the description reported above.

Examples 2-3

The propylene/ethylene copolymer obtained as described in example 1 has been visbroken with use of peroxide according to known techniques to a melt index of 2 and 6 respectively. The properties measured on the samples are collected in Table 2 together with the shrink results obtained by the films formed from the obtained copolymer according to the description reported above.

TABLE 1

| | | EXAMPLE 1 |
|---|---|---|
| TEA/Donor | g/g | 6 |
| TEA/Catalyst | g/g | 3 |
| Temperature | ° C. | 78 |
| Pressure | MPa | 27 |
| H2/C3 | mol/mol | 0.0020 |
| C2/(C2 +− C3) riser | Mol/mol | 0.09 |
| C2/(C2 +− C3) downer | | 0.025 |
| Reactor grade polymer properties | | |
| MFR | g/10' | 0.6 |
| C2 | wt % | 7.0% |
| X.S. | wt % | 17.7 |

TABLE 2

| | | EXAMPLE | | |
|---|---|---|---|---|
| | | 1 | 2 | 3 |
| Irganox B215 | wt % | 0.18 | 0.18 | 0.18 |
| DHT4A | wt % | 0.05 | 0.05 | 0.05 |
| Luperox 101 | wt % | 0.105 | 0.105 | 0.105 |
| Millad 3988 | wt % | 0.18 | 0.18 | 0.18 |
| Oil OB 22 AT | wt % | 0.05- | 0.05- | 0.05- |
| MIL | g/10' | 0.9 | 6 | 2 |
| Tensile modulus | MPa | 410 | 400 | 480 |
| D/B transition temperature | ° C. | −12.3 | −10.7 | −9.5 |
| Haze (on 1 mm plaque) | % | 19.9 | 37.4 | — |
| Melting temperature | ° C. | 129.0 | 135.0 | 132.2 |
| Shrink @ 100° C. | % | 22.5 | 20.1 | 21.3 |
| Shrink @ 110° C. | % | 37.5 | 34.6 | 35.9 |

The invention claimed is:

1. A mono-oriented film having a shrink rate at 100° C. of at least 15% and at least one layer comprising a propylene copolymer with ethylene and optionally other olefins of formula $CH_2$=CHR wherein R is an alkyl group containing from 2 to 10 carbon atoms, having at least 6 wt % of ethylene, a melt flow rate according to ISO 1133 (230° C., 216 kg) of less than 10, and a fraction of polymer soluble in xylene at 25'C ranging from 14 to 30 wt % based on the total weight of said copolymer.

2. The mono-oriented film according to claim 1 wherein the melt flow rate value according to ISO 113 is less than 5.

3. The mono-oriented film according to claim 1 wherein the fraction of polymer soluble in xylene at 25'C ranges from 15 to 25 wt %.

4. The mono-oriented film according to claim 1 wherein the propylene copolymer has a melting point determined via DSC of less than 140° C.

5. The mono-oriented film according to claim 1 wherein the shrink rate at 100° C. is higher than 20%.

6. The mono-oriented film according to claim 5 wherein the shrink rate at 110° C. is higher than 30%.

7. Shrink labels comprising the mono-oriented films according to claim 1.

\* \* \* \* \*